(12) United States Patent
Yokino et al.

(10) Patent No.: US 10,883,877 B2
(45) Date of Patent: *Jan. 5, 2021

(54) SPECTROSCOPE

(71) Applicant: HAMAMATSU PHOTONICS K.K., Hamamatsu (JP)

(72) Inventors: Takafumi Yokino, Hamamatsu (JP); Katsumi Shibayama, Hamamatsu (JP); Katsuhiko Kato, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/250,526

(22) Filed: Jan. 17, 2019

(65) Prior Publication Data

US 2019/0154504 A1 May 23, 2019

Related U.S. Application Data

(63) Continuation of application No. 15/116,231, filed as application No. PCT/JP2015/052963 on Feb. 3, 2015, now Pat. No. 10,184,834.

(30) Foreign Application Priority Data

Feb. 5, 2014 (JP) .................................. 2014-020656

(51) Int. Cl.
*G01J 3/28* (2006.01)
*G01J 3/02* (2006.01)
*G01J 3/18* (2006.01)

(52) U.S. Cl.
CPC ........... *G01J 3/2803* (2013.01); *G01J 3/0202* (2013.01); *G01J 3/0256* (2013.01); *G01J 3/0286* (2013.01);

(Continued)

(58) Field of Classification Search
CPC .......... G01J 3/2803; G01J 3/18; G01J 3/0291; G01J 3/0256; G01J 2003/1852
See application file for complete search history.

(56) References Cited

U.S. PATENT DOCUMENTS 4,563,697 A * 1/1986 Miura ................... G01L 19/003
174/50.54
5,040,889 A 8/1991 Keane
(Continued)

FOREIGN PATENT DOCUMENTS

CN 101542251 9/2009
CN 101970994 2/2011
(Continued)

OTHER PUBLICATIONS

International Preliminary Report on Patentability dated Aug. 18, 2016 for PCT/JP2015/052963.

*Primary Examiner* — Dominic J Bologna
(74) *Attorney, Agent, or Firm* — Faegre Drinker Biddle & Reath LLP

(57) ABSTRACT

A spectrometer 1A includes a package 2 having a stem 4 and a cap 5, an optical unit 10A disposed on the stem 4, and a lead pin 3 for securing the optical unit 10A to the stem 4. The optical unit 10A includes a dispersive part 21 for dispersing and reflecting light entering from a light entrance part 6 of the cap 5, a light detection element 30 having a light detection part 31 for detecting the light dispersed and reflected by the dispersive part 21, a support 40 for supporting the light detection element 30 such that a space is formed between the dispersive part 21 and the light detection element 30, and a projection 11 protruding from the support 40, the lead pin 3 being secured to the projection 11. The optical unit 10A is movable with respect to the stem 4 in a contact part of the optical unit 10A and the stem 4.

6 Claims, 17 Drawing Sheets

(52) U.S. Cl.
CPC .............. *G01J 3/0291* (2013.01); *G01J 3/18* (2013.01); *G01J 2003/1852* (2013.01)

(56) References Cited

U.S. PATENT DOCUMENTS

| | | | |
|---|---|---|---|
| 6,973,233 | B1 | 12/2005 | Tomita et al. |
| 7,180,590 | B2 | 2/2007 | Bastue et al. |
| 9,625,314 | B2 * | 4/2017 | Shibayama ............ G01J 3/0291 |
| 9,759,604 | B2 * | 9/2017 | Shibayama ............ G01J 3/0291 |
| 10,184,834 | B2 * | 1/2019 | Yokino ................. G01J 3/0291 |
| 2004/0141676 | A1 * | 7/2004 | Bugaud ..................... G01J 3/02 385/14 |
| 2004/0239931 | A1 | 12/2004 | Teichmann et al. |
| 2005/0007586 | A1 * | 1/2005 | Bastue ....................... G01J 3/02 356/328 |
| 2009/0262346 | A1 | 10/2009 | Egloff et al. |
| 2011/0128541 | A1 * | 6/2011 | Grueger ................ G01J 3/0256 356/326 |
| 2013/0235249 | A1 | 9/2013 | Shimbo et al. |
| 2014/0192354 | A1 * | 7/2014 | Yokino ................. G01J 3/0291 356/300 |

FOREIGN PATENT DOCUMENTS

| | | |
|---|---|---|
| CN | 102472714 | 5/2012 |
| CN | 102738039 | 10/2012 |
| CN | 202661250 | 1/2013 |
| CN | 103245998 | 8/2013 |
| JP | S58-146827 A | 9/1983 |
| JP | H06-22944 U | 3/1994 |
| JP | H10-185946 A | 7/1998 |
| JP | 2000-298066 A | 10/2000 |
| JP | 2004-354176 A | 12/2004 |
| JP | 2013-029325 | 2/2013 |
| JP | 2013-029327 A | 2/2013 |
| JP | 2013-186021 A | 9/2013 |
| WO | WO 2008/149939 A1 | 12/2008 |
| WO | WO 2012/114632 A1 | 8/2012 |
| WO | WO 2013/015008 A1 | 1/2013 |
| WO | WO 2013/015009 A1 | 1/2013 |
| WO | WO-2013015009 A1 * | 1/2013 ............ G01J 3/0264 |

* cited by examiner

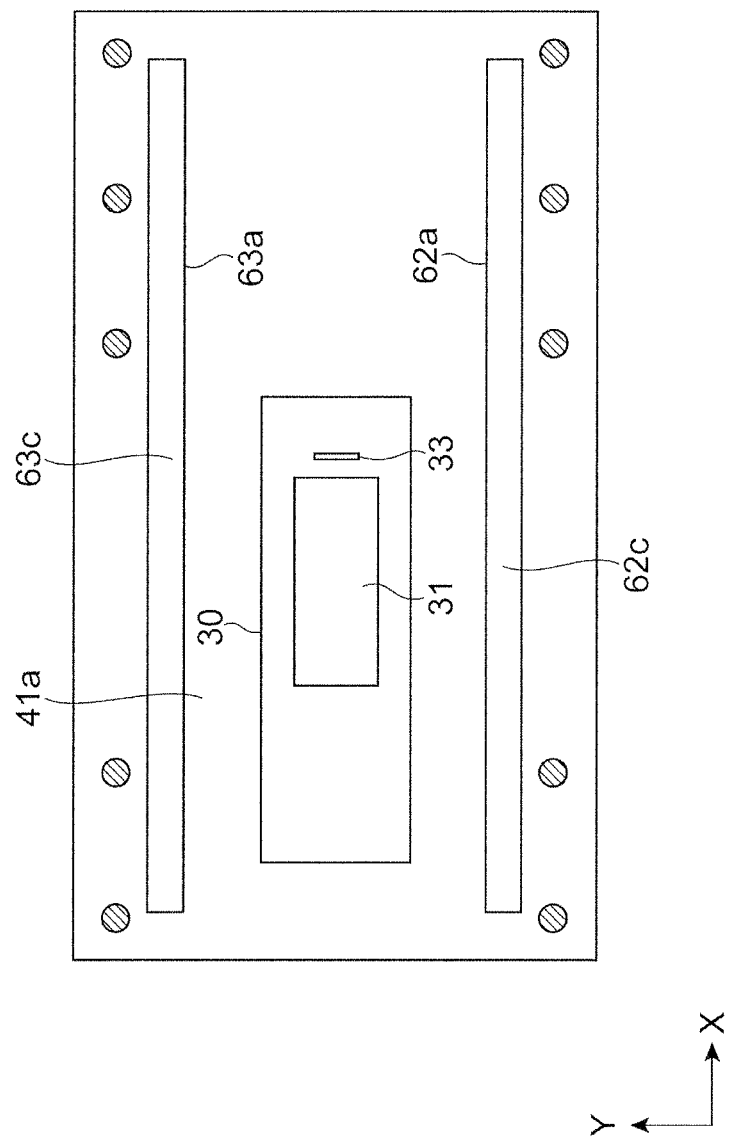

SPECTROSCOPE

TECHNICAL FIELD

The present invention relates to a spectrometer which disperses and detects light.

BACKGROUND ART

For example, Patent Literature 1 discloses a spectrometer including a light entrance part, a dispersive part for dispersing and reflecting light incident thereon from the light entrance part, a light detection element for detecting the light dispersed and reflected by the dispersive part, and a box-shaped support for supporting the light entrance part, dispersive part, and light detection element.

CITATION LIST

Patent Literature

Patent Literature 1: Japanese Unexamined Patent Publication No. 2000-298066

SUMMARY OF INVENTION

Technical Problem

Incidentally, the above-described spectrometer has a problem of a wavelength-temperature dependency in which a positional relationship between a dispersive part and a light detection part of a light detection element varies and a peak wavelength of detected light is shifted as a result of expansion and contraction of a material due to a temperature change of an environment in which the spectrometer is used, heating in the light detection part of the light detection element, etc. When the amount of the shifted peak wavelength (wavelength shift amount) of the detected light becomes large, there is concern that detection accuracy of the spectrometer decreases.

In this regard, an object of the present invention is to provide a spectrometer capable of suppressing a decrease in detection accuracy.

Solution to Problem

A spectrometer in accordance with one aspect of the present invention includes a package having a stem and a cap provided with a light entrance part, an optical unit disposed on the stem inside the package, and a fixing member configured to secure the optical unit to the stem, wherein the optical unit includes a dispersive part configured to disperse and reflect light entering the package from the light entrance part, a light detection element having a light detection part configured to detect the light dispersed and reflected by the dispersive part, a support configured to support the light detection element such that a space is formed between the dispersive part and the light detection element, and a projection protruding from the support, the fixing member being secured to the projection, and the optical unit is movable with respect to the stem in a contact part of the optical unit and the stem.

In the spectrometer, the optical unit is disposed on the stem inside the package. In this way, it is possible to suppress a decrease in detection accuracy resulting from deterioration of a member, etc. In addition, the optical unit is positioned with respect to the package by the fixing member. Meanwhile, the optical unit is movable with respect to the stem in the contact part of the optical unit and the stem. That is, the optical unit is not secured to the stem by adhesion, etc. In this way, it is possible to mitigate residual stress or stress between the stem and the optical unit resulting from expansion and contraction of the stem due to a temperature change of an environment in which the spectrometer is used, heating in the light detection element, etc., and to suppress occurrence of a variation in positional relationship between the dispersive part and the light detection part of the light detection element. Therefore, the spectrometer may reduce a wavelength shift amount resulting from expansion and contraction of a material of the spectrometer, and suppress a decrease in detection accuracy.

In the spectrometer in accordance with one aspect of the present invention, the dispersive part may be included in a dispersive element by being provided on a substrate, the support may include a base wall part disposed to oppose the stem, the light detection element being fixed to the base wall part, and a side wall part disposed to erect from a side of the dispersive part to the stem, the side wall part supporting the base wall part, and the side wall part may be joined to the substrate in a portion of a contact part of the side wall part and the substrate. According to this configuration, when the side wall part of the support is joined to the substrate in a portion of the contact part of the side wall part and the substrate, the dispersive part is appropriately positioned with respect to the light detection element secured to the base wall part. Meanwhile, the side wall part is not fully joined to the substrate, and thus stress or residual stress mutually applied to the support and the substrate due to expansion and contraction is mitigated. In this way, it is possible to suppress a position shift between the dispersive part and the light detection element, and to further reduce a wavelength shift amount resulting from expansion and contraction of the material of the spectrometer.

In the spectrometer in accordance with one aspect of the present invention, the side wall part may include a first wall part and a second wall part opposing each other, the first wall part may be joined to the substrate in at least a portion of a contact part of the first wall part and the substrate, and the second wall part may be movable with respect to the substrate in a contact part of the second wall part and the substrate. According to this configuration, a configuration of the support may be simplified and a positional relationship of the support with respect to the substrate may be stabilized by the first wall part and the second wall part provided to oppose each other with the dispersive part interposed therebetween. Further, when at least a portion of only one of the wall parts of the support (first wall part) is joined to the substrate (one side joint), it is possible to reliably position the support with respect to the substrate, and to mitigate stress or residual stress mutually applied to the support and the substrate due to expansion and contraction.

In the spectrometer in accordance with one aspect of the present invention, an area of the contact part of the first wall part and the substrate may be larger than an area of the contact part of the second wall part and the substrate. According to this configuration, it is possible to mitigate stress or residual stress mutually applied to the support and the substrate due to expansion and contraction while securing a sufficient area for joining the support to the substrate.

In the spectrometer in accordance with one aspect of the present invention, an area of the contact part of the first wall part and the substrate may be smaller than an area of the contact part of the second wall part and the substrate. According to this configuration, it is possible to further mitigate stress or residual stress mutually applied to the support and the substrate due to expansion and contraction by suppressing an area for joining the support to the substrate.

In the spectrometer in accordance with one aspect of the present invention, the first wall part and the second wall part may oppose each other in a direction parallel to a direction in which the light detection part is shifted from the dispersive part when viewed in a direction in which the stem and the base wall part oppose each other. According to this configuration, it is possible to simplify a manufacturing operation for providing the light detection element on the support, and to effectively use a free space on the substrate.

In the spectrometer in accordance with one aspect of the present invention, the dispersive part may be included in a dispersive element by being provided on a substrate, the support may include a base wall part disposed to oppose the stem, the light detection element being fixed to the base wall part, and a side wall part disposed to erect from a side of the dispersive part to the stem, the side wall part supporting the base wall part, the side wall part may include a first wall part and a second wall part opposing each other in a direction perpendicular to a direction in which the light detection part is shifted from the dispersive part when viewed in a direction in which the stem and the base wall part oppose each other, and the side wall part may be joined to the substrate in at least a portion of a contact part of the side wall part and the substrate. According to this configuration, the first wall part and the second wall part are provided to oppose each other in a direction in which an influence on a wavelength shift amount is small when a position shift occurs. Thus, it is possible to further reduce a wavelength shift amount resulting from stress or residual stress mutually applied to the support and the substrate due to expansion and contraction.

Advantageous Effects of Invention

According to the present invention, it is possible to provide a spectrometer capable of suppressing a decrease in detection accuracy.

BRIEF DESCRIPTION OF DRAWINGS

FIG. 17 is a bottom view of a support of a modified example of the spectrometer of FIG. 14.

DESCRIPTION OF EMBODIMENTS

Figure 1:
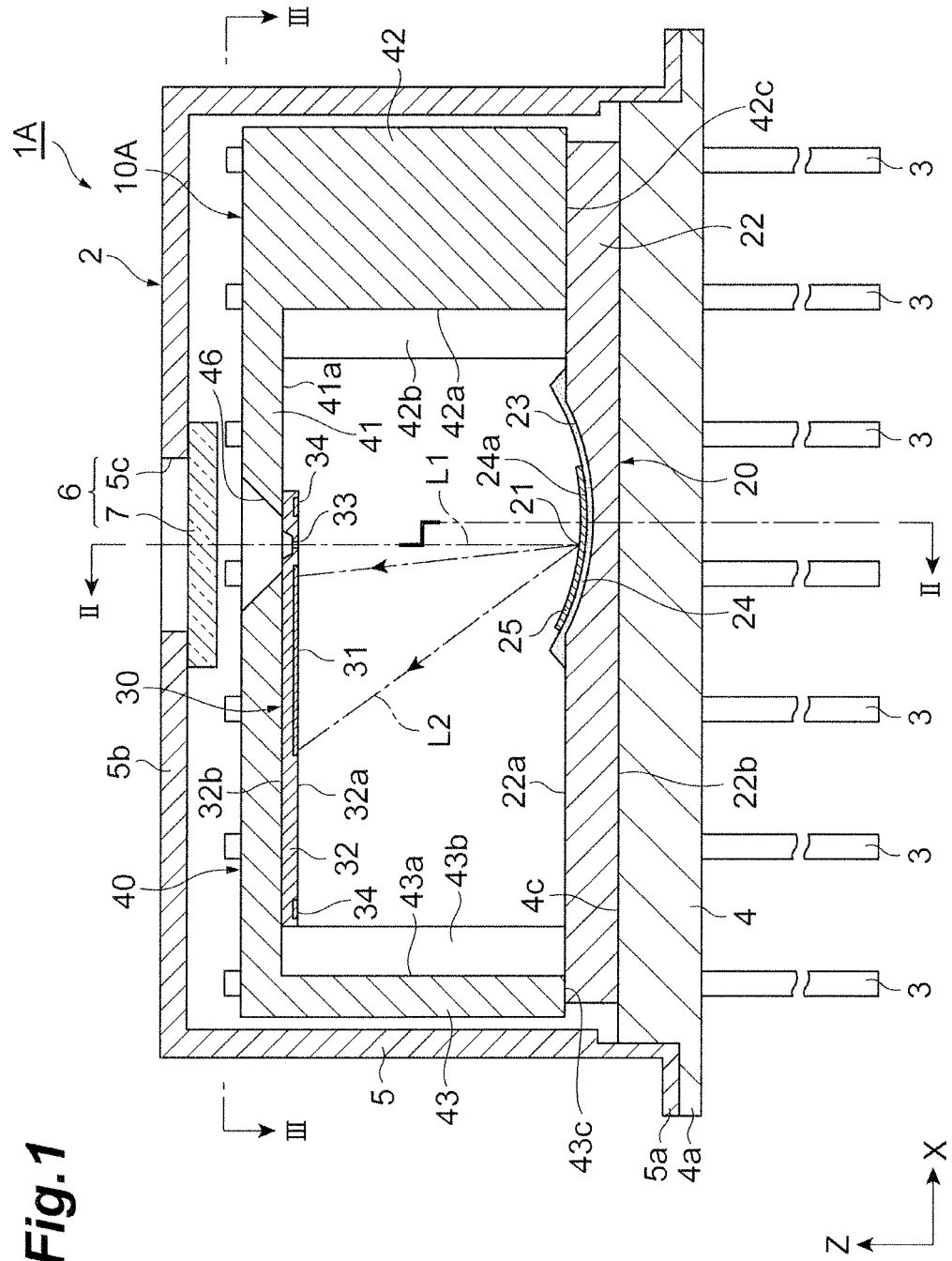
FIG. 1 is a sectional view of a spectrometer in accordance with a first embodiment of the present invention.

In the following, preferred embodiments of the present invention will be explained in detail with reference to the drawings. In the drawings, the same or equivalent parts will be referred to with the same signs while omitting their overlapping descriptions.

First Embodiment

Figure 2:
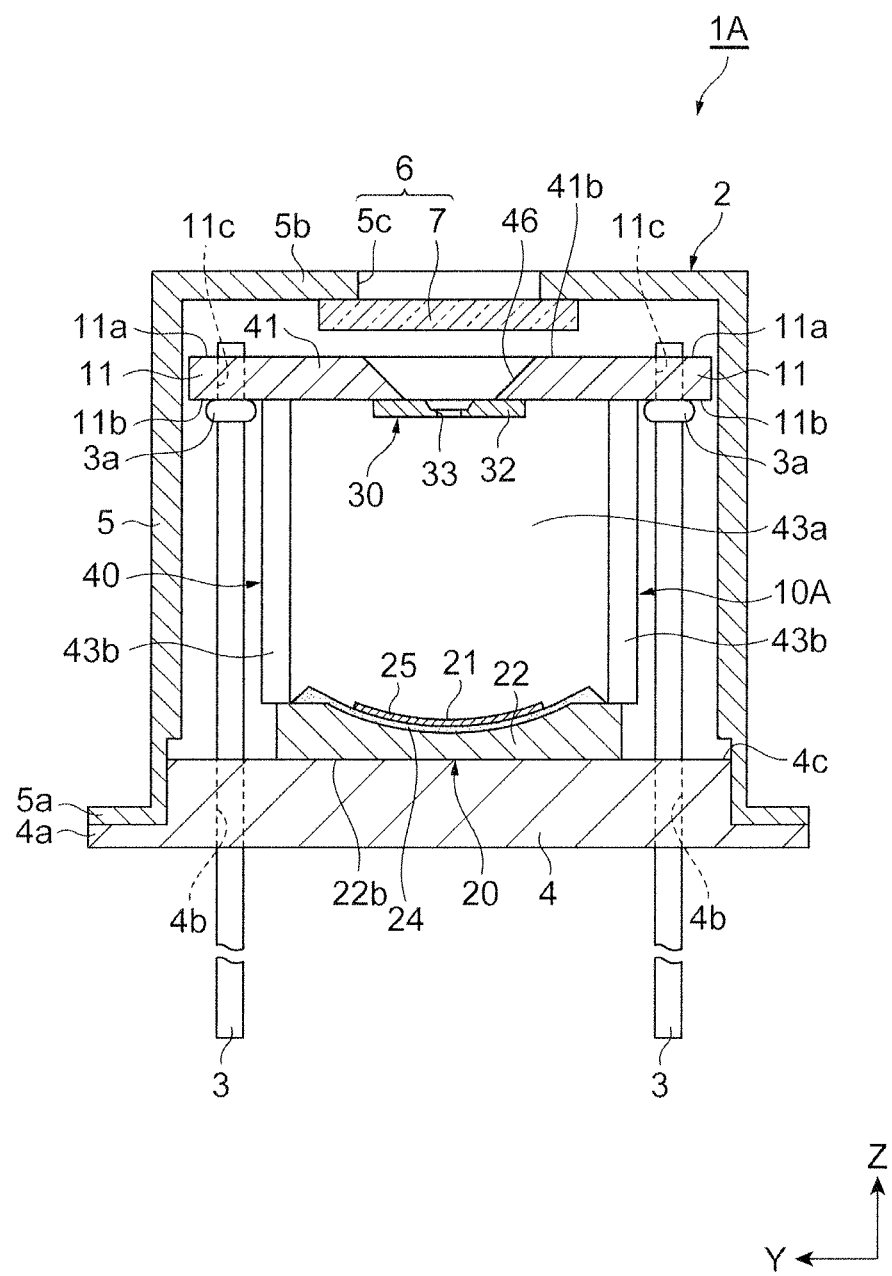
FIG. 2 is a sectional view taken along the line II-II of FIG. 1 and seen as a side view.

As illustrated in FIGS. 1 and 2, a spectrometer 1A includes a package 2 having a structure of a CAN package, an optical unit 10A contained in the package 2, and a plurality of lead pins (fixing members) 3. The package 2 has a rectangular plate-like stem 4 made of a metal and a cap 5 shaped into a rectangular parallelepiped box made of a metal. The stem 4 and the cap 5 are joined to each other airtightly while a flange part 4a of the step 4 and a flange part 5a of the cap 5 are in contact with each other. By way of example, the stem 4 and the cap 5 are airtightly sealed to each other in a vacuum atmosphere or a nitrogen atmosphere under dew point management (e.g., at −55° C.). In this way, it is possible to suppress a decrease in detection accuracy resulting from deterioration of a member in the package 2 due to moisture, occurrence of condensation in the package 2 due to a decrease in ambient temperature, etc. For example, one side of the package 2 has a length of about 10 to 20 mm.

In the cap 5, a wall part 5b opposing the stem 4 is provided with a light entrance part 6 for letting light L1 into the package 2 from the outside thereof. The light entrance part 6 is constructed by airtightly joining a window member 7 having a disk or rectangular plate form to an inner surface of the wall part 5b so that the window member 7 covers a light transmission hole 5c having a circular cross section formed in the wall part 5b. The window member 7 is made of a material which transmits the light L1 therethrough, examples of which include silica, borosilicate glass (BK7), Pyrex (registered trademark) glass, and Kovar glass. Silicon and germanium are also effective for infrared rays. The window member 7 may also be provided with an AR (Anti Reflection) coat. The window member 7 may further have such a filter function as to transmit therethrough only a predetermined wavelength of light. In addition, when the window member 7 is formed by welding Kovar glass, etc. to the inner surface of the wall part 5b, Kovar glass, etc. may move into the light transmission hole 5c to fill the light transmission hole 5c.

Each lead pin 3 penetrates through the stem 4 while being arranged in a through hole 4b of the stem 4. Each lead pin 3 is made of a metal constructed by applying nickel plating (1 to 10 μm) and gold plating (0.1 to 2 μm) and the like to Kovar metal, for example, and extends in the direction in which the light entrance part 6 and the stem 4 oppose each other (hereinafter referred to as "Z-axis direction"). Each lead pin 3 is secured to the through hole 4b through a hermetic seal member made of glass for sealing such as low-melting glass having electrically-insulating and light-shielding properties. In each of a pair of side edge parts of the rectangular-plate-shaped stem 4 opposing each other in a direction (hereinafter referred to as "Y-axis direction") perpendicular to its longitudinal direction (hereinafter referred to as "X-axis direction") and Z-axis direction, a plurality of through holes 4b are arranged in a row along the X-axis direction.

The optical unit 10A is arranged on the stem 4 within the package 2. The optical unit 10A has a dispersive element 20, a light detection element 30, and a support 40. The dispersive element 20 is provided with a dispersive part 21, which disperses and reflects the light L1 entering the package 2 from the light entrance part 6. The light detection element 30 detects light L2 dispersed and reflected by the dispersive part 21. The support 40 supports the light detection element 30 so as to form a space between the dispersive part 21 and the light detection element 30.

The dispersive element 20 has a substrate 22 having a rectangular plate form made of silicon, plastic, ceramic, glass, or the like. In the substrate 22, a surface 22a on the light entrance part 6 side is formed with a depression 23 having a curved inner surface. A molded layer 24 is arranged on the surface 22a of the substrate 22 so as to cover the depression 23. The molded layer 24 is formed into a film along the inner surface of the depression 23 and has a circular form when viewed in the Z-axis direction.

A grating pattern 24a corresponding to a blazed grating having a serrated cross section, a binary grating having a rectangular cross section, a holographic grating having a sinusoidal cross section, or the like is formed in a predetermined region of the molded layer 24. The grating pattern 24a is constructed by a plurality of grating grooves along the X-axis direction, each extending in the Y-axis direction when viewed in the Z-axis direction. This molded layer 24 is formed by pressing a mold die against a molding material (e.g., photocuring epoxy resins, acrylic resins, fluorine-based resins, silicone, and replica optical resins such as organic/inorganic hybrid resins) and curing the molding material (e.g., by photocuring or thermal curing) in this state.

A reflecting film 25, which is a vapor-deposited film made of Al, Au, or the like, is formed on a surface of the molded layer 24 so as to cover the grating pattern 24a. The reflecting film 25 is formed along a shape of the grating pattern 24a. A surface on the light entrance part 6 of the reflecting film 25 formed along the shape of the grating pattern 24a serves as the dispersive part 21 in the form of a reflection grating. As in the foregoing, the dispersive part 21 is provided on the substrate 22, so as to construct the dispersive element 20.

The light detection element 30 has a substrate 32 having a rectangular plate form made of a semiconductor material such as silicon. The substrate 32 is formed with a slit 33 extending in the Y-axis direction. The slit 33 is located between the light entrance part 6 and the dispersive part 21 and transmits therethrough the light L entering the package 2 from the light entrance part 6. In the slit 33, an end part on the light entrance part 6 side widens toward the light entrance part 6 in each of the X- and Y-axis directions.

In the substrate 32, a surface 32a on the dispersive part 21 side is provided with a light detection part 31 in juxtaposition with the slit 33 along the X-axis direction. The light detection part 31 is constructed as a photodiode array, a C-MOS image sensor, a CCD image sensor, or the like. The surface 32a of the substrate 32 is provided with a plurality of terminals 34 for inputting/outputting electric signals to/from the light detection part 31. The X-axis direction is a direction parallel to a direction in which the light detection part 31 is shifted from the dispersive part 21 when viewed in the Z-axis direction. Herein, the phrase "the light detection part 31 is shifted from the dispersive part 21" means that a region of the light detection part 31 not overlapping the dispersive part 21 is present when viewed in the Z-axis direction. That is, the phrase "the direction in which the light detection part 31 is shifted from the dispersive part 21" means a direction in which a region of the light detection part 31 not overlapping the dispersive part 21 is present with respect to the dispersive part 21 when viewed in the Z-axis direction. This direction is the same as a direction in which the light detection part 31 is provided with respect to the slit 33 when viewed in the Z-axis direction. In addition, the X-axis direction is a direction in which the grating grooves of the grating pattern 24a are arranged, and is a direction in which photodiodes are arranged in the light detection part 31. Meanwhile, the Y-axis direction is a direction perpendicular to a direction in which the light detection part 31 is shifted from the dispersive part 21 (X-axis direction) when viewed in the Z-axis direction.

The support 40 is a hollow structure including a base wall part 41 arranged so as to oppose the stem 4 in the Z-axis direction, and a side wall part (first wall part) 42 and a side wall part (second wall part) 43 arranged so as to oppose each other in the X-axis direction. The side wall part 43 is disposed on a side on which the light detection part 31 is provided with respect to the slit 33. The side wall part 42 is provided on the opposite side from the side on which the light detection part 31 is provided with respect to the slit 33. A width of the side wall part 42 is larger than a width of the side wall part 43. The side wall parts 42 and 43 are disposed to erect from a side of the dispersive part 21 to the stem 4, and support the base wall part 41 at both sides interposing the dispersive part 21 therebetween in the X-axis direction.

The light detection element 30 is secured to the base wall part 41. The light detection element 30 is secured to the base wall part 41 by bonding a surface 32b of the substrate 32 on the side opposite from the dispersive part 21 to an inner surface 41a of the base wall part 41. That is, the light detection element 30 is arranged on the stem 4 side of the base wall part 41.

The base wall part 41 is formed with a light transmission hole (light transmission part) 46 for communicating the inside and outside spaces of the support 40 in the form of a hollow structure to each other. The light transmission hole 46 is located between the light entrance part 6 and the slit 33 of the substrate 32 and transmits therethrough the light L1 entering the package 2 from the light entrance part 6. The light transmission hole 46 widens toward the light entrance part 6 in each of the X- and Y-axis directions. When viewed in the Z-axis direction, the light transmission hole 5c of the light entrance part 6 includes the light transmission hole 46 as a whole. In addition, when viewed in the Z-axis direction, the light transmission hole 46 includes the slit 33 as a whole.

Figure 4:
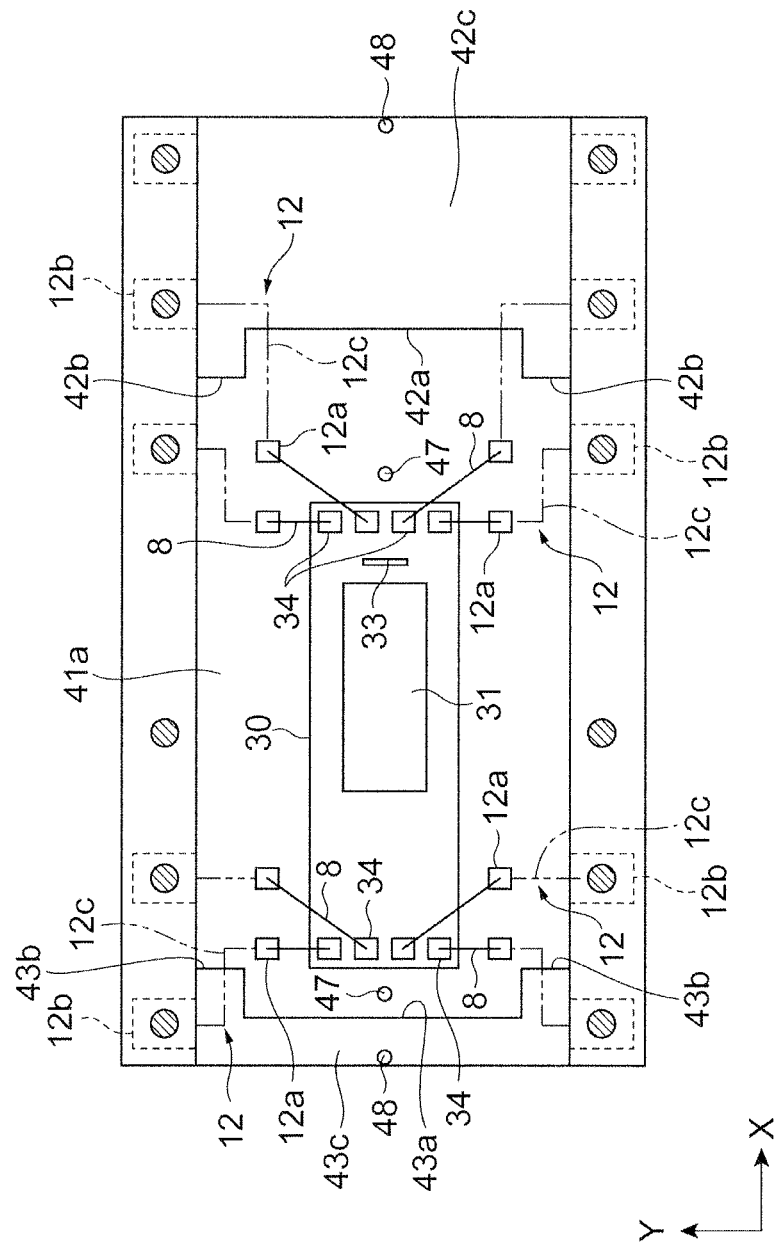
FIG. 4 is a bottom view of a support of the spectrometer of FIG. 1.

As illustrated in FIG. 1, FIG. 2, and FIG. 4, at both end sides of a side surface 42a forming an inner end part of the side wall part 42 in the Y-axis direction, projections 42b are formed to protrude to a side at which the dispersive part 21 is disposed with respect to the side surface 42a (that is, the inside of the support 40 which is a hollow structure). The projections 42b extend in the Z-axis direction. Similarly, at both end sides of a side surface 43a forming an inner end part of the side wall part 43 in the Y-axis direction, projections 43b are formed to protrude to a side at which the dispersive part 21 is disposed with respect to the side surface 43a (that is, the inside of the support 40 which is a hollow structure). The projections 43b extend in the Z-axis direction. When the projections 42b and 43b are formed in the side wall parts 42 and 43, positioning of the support 40 with respect to the substrate 22 is stabilized.

Figure 3:
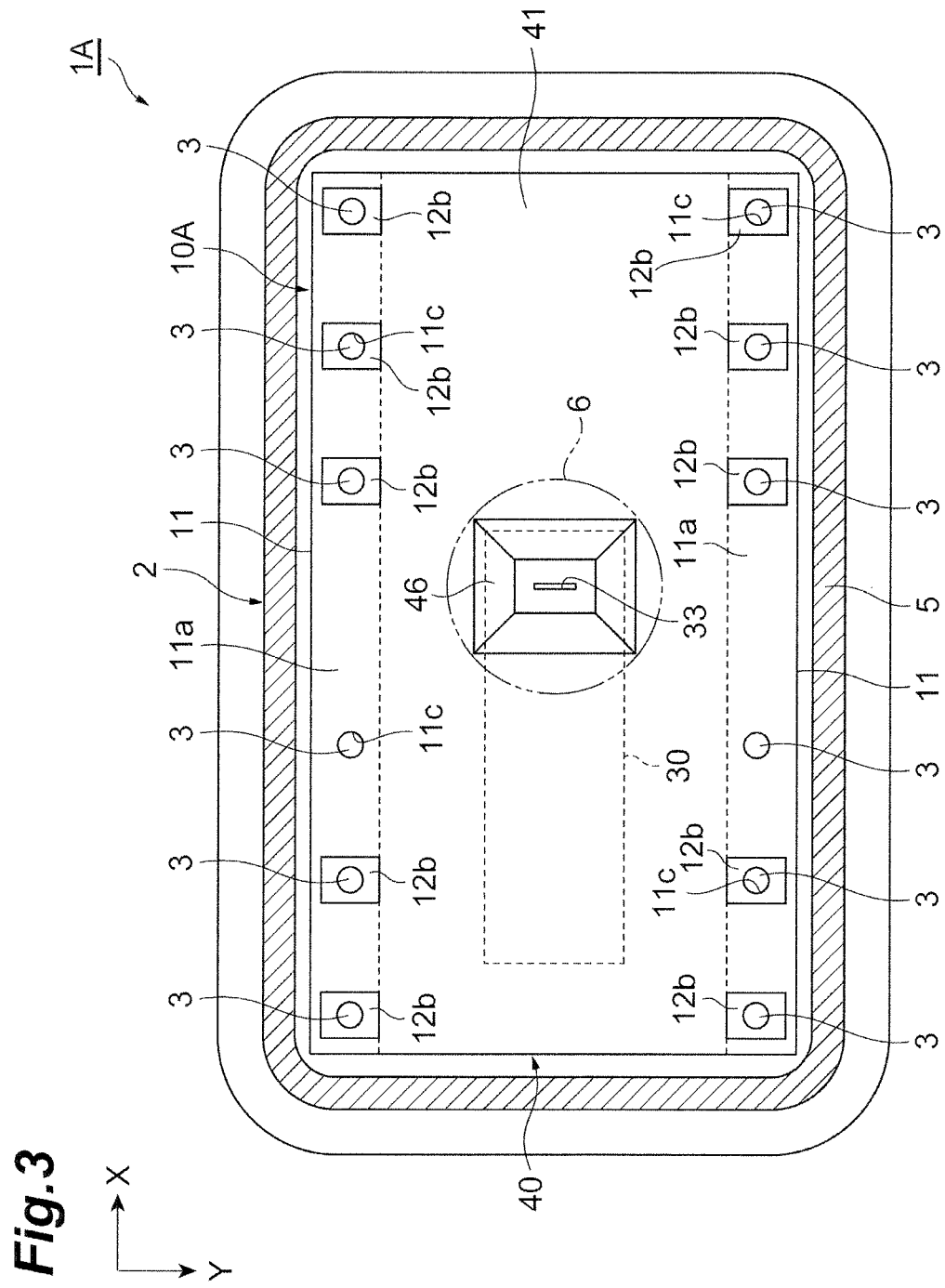
FIG. 3 is a sectional view taken along the line III-III of FIG. 1 and seen as a plan view.

As illustrated in FIGS. 2 and 3, the optical unit 10A further includes projections 11 projecting from the support 40. Each projection 11 is arranged at such a position as to be separated from the stem 4. The projection 11 projects from an end part of each side wall part (the side wall part 42 and the side wall part 43) on the side opposite from the stem 4 to the side opposite from the dispersive part 21 in the Y-axis direction (i.e., the outside of the support 40 in the form of a hollow structure) and extends in the X-axis direction to connect end parts of the side wall part 42 and the side wall part 43 in the Y-axis direction. In the optical unit 10A, the outer surface 41b of the base wall part 41 and the surface 11a of the projection 11 on the side opposite from the stem 4 are substantially flush with each other.

As illustrated in FIGS. 1 and 2, in the optical unit 10A, a surface 22b of the substrate 22 of the dispersive element 20 on the stem 4 side touches an inner surface 4c of the stem 4. However, the surface 22b of the substrate 22 is not secured to the inner surface 4c of the stem 4 by adhesion, etc. That is, the optical unit 10A is movable with respect to the stem 4 in a contact part of the optical unit 10A and the stem 4 (a portion in which the surface 22b of the substrate 22 touches the inner surface 4c of the stem 4).

The surface 22a of the substrate 22 touches a bottom face 42c corresponding to an end part of the side wall part 42 on the stem 4 side and a bottom face 43c corresponding to an end part of the side wall part 43 on the stem 4 side. For example, the bottom face 42c of the side wall part 42 is attached and joined to the surface 22a of the substrate 22 using an adhesive material such as epoxy resin, acrylic resin, silicone, organic/inorganic hybrid resin, a paste resin such as silver paste resin, etc. In this way, the substrate 22 is positioned with respect to the support 40. On the other hand, the bottom face 43c of the side wall part 43 is not joined to the surface 22a of the substrate 22. That is, the side wall part 43 is movable with respect to the substrate 22 in a contact part of the side wall part 43 and the substrate 22 (a portion in which the bottom face 43c of the side wall part 43 touches the surface 22a of the substrate 22). A method of joining the bottom face 42c of the side wall part 42 to the surface 22a of the substrate 22 is not restricted to the above-described attaching and joining. For example, the bottom face 42c of the side wall part 42 may be joined to the surface 22a of the substrate 22 using welding or direct bonding.

As illustrated in FIG. 4, the optical unit 10A further includes a wiring 12 provided in the support 40. The wiring 12 includes a plurality of first terminal parts 12a, a plurality of second terminal parts 12b, and a plurality of connection parts 12c. The first terminal parts 12a are arranged on the inner surface 41a of the base wall part 41 and exposed to the inner space of the support 40. The second terminal parts 12b are arranged on the surfaces 11a of the projections 11 and exposed to the space on the outside of the support 40 but inside of the package 2. The connection parts 12c, each connecting its corresponding first and second terminal parts 12a and 12b to each other, are embedded in the support 40.

The wiring 12 is provided in the base wall part 41, side wall parts 42 and 43, and projections 11, which are integrally formed, so as to construct a molded interconnect device (MID). In this case, the base wall part 41, side wall parts 42 and 43, and projections 11 are made of a molding material, examples of which include ceramics such as AlN and $Al_2O_3$, resins such as LCP, PPA, and epoxy, and glass for molding.

The terminals 34 of the light detection element 30 secured to the base wall part 41 are electrically connected to their corresponding first terminal parts 12a of the wiring 12. The terminal 34 of the light detection element 30 and the first terminal part 12a of the wiring 12 corresponding to each other are electrically connected to each other by wire bonding using wires 8.

As illustrated in FIGS. 2 and 3, the lead pins 3 penetrating through the stem 4 are electrically connected to their corresponding second terminal parts 12b of the wiring 12. Each lead pin 3 is provided with a flange-shaped stopper 3a. The lead pins 3 extend to the projections 11 arranged at such positions as to be separated from the stem 4 and are inserted through their corresponding through holes 11c of the projections 11 while the stoppers 3a are in contact with the projections 11 from the stem 4 side (i.e., while the stoppers 3a are in contact with the surfaces 11b on the stem 4 side of the projections 11). Each second terminal part 12b surrounds its corresponding through hole 11c on the surface 11a of the projection 11. In this state, the lead pin 3 and the second terminal part 12b of the wiring 12 corresponding to each other are electrically connected to each other with a conductive resin, solder, a gold wire, or the like. Here, the lead pins 3 include those simply secured to the through holes 4b of the stem 4 and the through holes 11c of the projections 11 but not electrically connected to the wiring 12. The optical unit 10A is positioned with respect to the package 2 by the lead pins 3.

In thus constructed spectrometer 1A, as illustrated in FIG. 1, the light L1 enters the package 2 from the light entrance part 6 thereof and passes through the light transmission hole 46 of the base wall part 41 and the slit 33 of the light detection element 30 in sequence, thereby coming into the inner space of the support 40. The light L1 entering the inner space of the support 40 reaches the dispersive part 21 of the dispersive element 20 and is dispersed and reflected by the dispersive part 21. The light L2 dispersed and reflected by the dispersive part 21 reaches the light detection part 31 of the light detection element 30 and is detected by the light detection element 30. At this time, electric signals are inputted to and outputted from the light detection part 31 of the light detection element 30 through the terminals 34 of the light detection element 30, the wires 8, the wiring 12, and the lead pins 3.

A method for manufacturing the spectrometer 1A will now be explained. First, a molded interconnect device provided with the integrally formed base wall part 41, side wall parts 42 and 43, and projections 11 with the wiring 12 is prepared. Subsequently, as illustrated in FIG. 4, the light detection element 30 is bonded to the inner surface 41a of the base wall part 41 of the support 40 with reference to alignment marks 47 provided on the inner surface 41a. Then, the terminal 34 of the light detection element 30 and the first terminal part 12a of the wiring 12 corresponding to each other are electrically connected to each other by wire bonding with the wires 8. Thereafter, the surface 22a of the substrate 22 coming into contact with the bottom face 42c is bonded to the bottom face 42c of the side wall part 42 with reference to alignment marks 48 provided on the respective bottom faces 42c and 43c of the side wall parts 42 and 43 of the support 40.

In thus manufactured optical unit 10A, the dispersive part 21 and the light detection part 31 are accurately positioned with respect to each other in the X- and Y-axis directions by mounting with reference to the alignment marks 47 and 48. The dispersive part 21 and the light detection part 31 are also accurately positioned with respect to each other in the Z-axis direction by the difference in level between the bottom faces 42c and 43c of the side wall part 42 and 43 and the inner surface 41a of the base wall part 41. Here, the slit 33 and the light detection part 31 are accurately positioned with respect to each other in the light detection element 30 during its manufacturing. Therefore, the optical unit 10A becomes one in which the slit 33, dispersive part 21, and light detection part 31 are accurately positioned with respect to each other.

Next, as illustrated in FIGS. 2 and 3, the stem 4 having the lead pins 3 secured to the through holes 4b is prepared. Then, the optical unit 10A is positioned with respect to (secured to) the inner surface 4c of the stem 4 while inserting the lead pins 3 into the through holes 11c of the projections 11 of the optical unit 10A. Subsequently, the lead pin 3 and the second terminal part 12b of the wiring 12 corresponding to each other are electrically connected to each other with a conductive resin, solder, a gold wire, or the like. Then, as illustrated in FIGS. 1 and 2, the cap 5 provided with the light entrance part 6 is prepared, and the stem 4 and cap 5 are airtightly joined to each other. The foregoing manufactures the spectrometer 1A.

Effects produced by the spectrometer 1A will now be explained. First, in the spectrometer 1A, the optical unit 10A is disposed on the stem 4 inside the package 2. In this way, it is possible to suppress a decrease in detection accuracy resulting from deterioration of a member in the package 2 due to moisture, occurrence of condensation in the package 2 due to a decrease in ambient temperature, etc. In addition, the optical unit 10A is positioned with respect to the package 2 by the lead pins 3. Meanwhile, the optical unit 10A is movable with respect to the stem 4 in the contact part of the optical unit 10A and the stem 4. That is, the optical unit 10A is not secured to the stem 4 by adhesion, etc. In this way, it is possible to mitigate residual stress or stress between the stem 4 and the optical unit 10A resulting from expansion and contraction of the stem 4 due to a temperature change of an environment in which the spectrometer 1A is used, heating in the light detection part 31 of the light detection element 30, etc., and to suppress occurrence of a variation in positional relationship between the dispersive part 21 and the light detection part 31 of the light detection element 30. Therefore, the spectrometer 1A may reduce a wavelength shift amount resulting from expansion and contraction of a material of the spectrometer 1A, and suppress a decrease in detection accuracy.

In addition, when the side wall parts 42 and 43 of the support 40 are joined to the substrate 22 in a portion (a portion in which the surface 22a of the substrate 22 touches the bottom face 42c of the side wall part 42) of the contact part of the side wall parts 42 and 43 and the substrate 22 (a portion in which the surface 22a of the substrate 22 touches the bottom faces 42c and 43c of the side wall parts 42 and 43), the dispersive part 21 is appropriately positioned with respect to the light detection element 30 secured to the base wall part 41. Meanwhile, the side wall part 43 of the support 40 is not fully joined to the substrate 22, and thus stress or residual stress mutually applied to the support 40 and the substrate 22 due to expansion and contraction is mitigated. In this way, it is possible to suppress a position shift between the dispersive part 21 and the light detection element 30, and to further reduce a wavelength shift amount resulting from expansion and contraction of the material of the spectrometer 1A.

In addition, a configuration of the support 40 may be simplified and a positional relationship of the support 40 with respect to the substrate 22 may be stabilized by the side wall part 42 and the side wall part 43 provided to oppose each other with the dispersive part 21 interposed therebetween. Further, when at least a portion of only one of the side wall parts 42 and 43 of the support 40 (for example, the side wall part 42 in the present embodiment) is joined to the substrate 22 (one side joint), it is possible to reliably position the support 40 with respect to the substrate 22, and to mitigate stress or residual stress mutually applied to the support 40 and the substrate 22 due to expansion and contraction.

In addition, an area of a contact part of the side wall part 42 and the substrate 22 joined to each other by adhesion, etc. is larger than an area of a contact part of the side wall part 43 and the substrate 22 not joined to each other. Thus, it is possible to mitigate stress or residual stress mutually applied to the support 40 and the substrate 22 due to expansion and contraction while securing a sufficient area for joining the support 40 to the substrate 22.

In addition, the side wall part 42 and the side wall part 43 are provided to oppose each other in the X-axis direction. When the support 40 has such a configuration, it is possible to simplify a manufacturing operation for providing the light detection element 30 on the support 40, and to effectively use a free space on the substrate 22. Specifically, a width of an open ceiling space of the support 40 (a distance between the side surface 42a of the side wall part 42 and the side surface 43a of the side wall part 43) may be set to be large, and thus the light detection element 30 is more easily installed in the base wall part 41. Further, the free space on the substrate 22 formed at both sides of the dispersive part 21 and the molded layer 24 in the X-axis direction may be effectively used as a bonding surface of the side wall parts 42 and 43.

Next, a description will be given on a modified example of the above-described spectrometer 1A. In the spectrometer 1A, the contact part of the side wall part 42 and the substrate 22 may be joined to each other by adhesion, etc., and the contact part of the side wall part 43 and the substrate 22 may be joined to each other by adhesion, etc. In this case, as described in the foregoing, stress or residual stress mutually applied to the support 40 and the substrate 22 due to expansion and contraction increases when compared to a case in which the contact part of the side wall part 43 and the substrate 22 is not joined to each other. However, it is possible to more reliably position the substrate 22 and the support 40.

In addition, the contact part of the side wall part 43 and the substrate 22 may be joined to each other in place of joining the contact part of the side wall part 42 and the substrate 22. In this case, an area of the contact part of the side wall part 43 and the substrate 22 joined to each other becomes smaller than an area of the contact part of the side wall part 42 and the substrate 22 not joined to each other. Thus, an area for joining the support 40 to the substrate 22 is suppressed. In this way, it is possible to further mitigate stress or residual stress mutually applied to the support 40 and the substrate 22 due to expansion and contraction. Further, the side wall part 42 and the side wall part 43 may have the same width, and the width of the side wall part 43 may be larger than the width of the side wall part 42.

Figure 5:
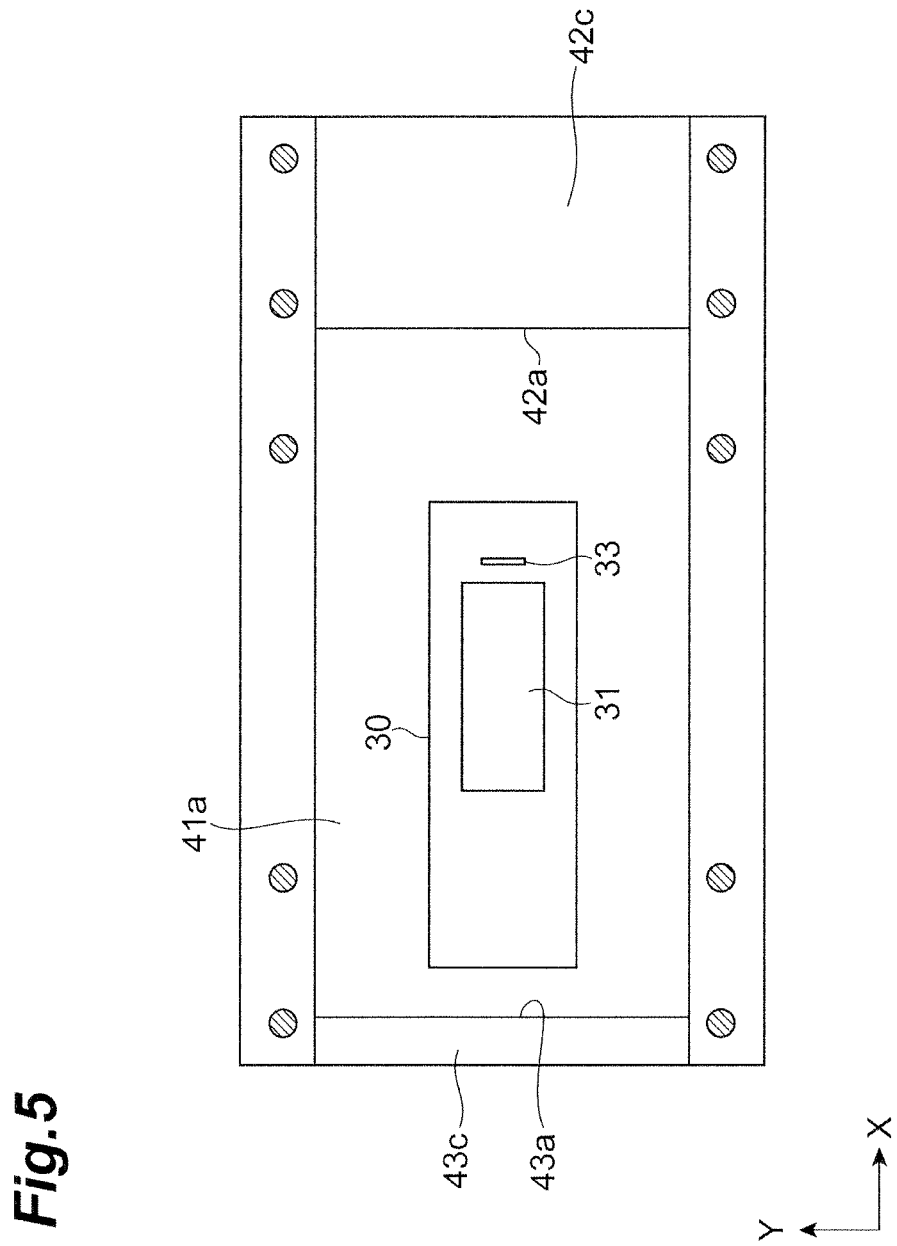
FIG. 5 is a bottom view of a support of a modified example of the spectrometer of FIG. 1.

In addition, as illustrated in FIG. 5, the projections 42b and the projections 43b may not be formed in the side wall part 42 and the side wall part 43. In this case, each of the side wall part 42 and the side wall part 43 has a rectangular shape when viewed in the Z-axis direction. In addition, alternatively, for example, the projections may be formed in one of the side wall part 42 and the side wall part 43. Referring to FIG. 5, a wiring, etc. is not illustrated, and only the support 40 and the light detection element 30 are mainly illustrated, which is similarly applied to FIG. 6, FIG. 9, FIG. 13, FIG. 16, and FIG. 17 used for description below.

Figure 6:
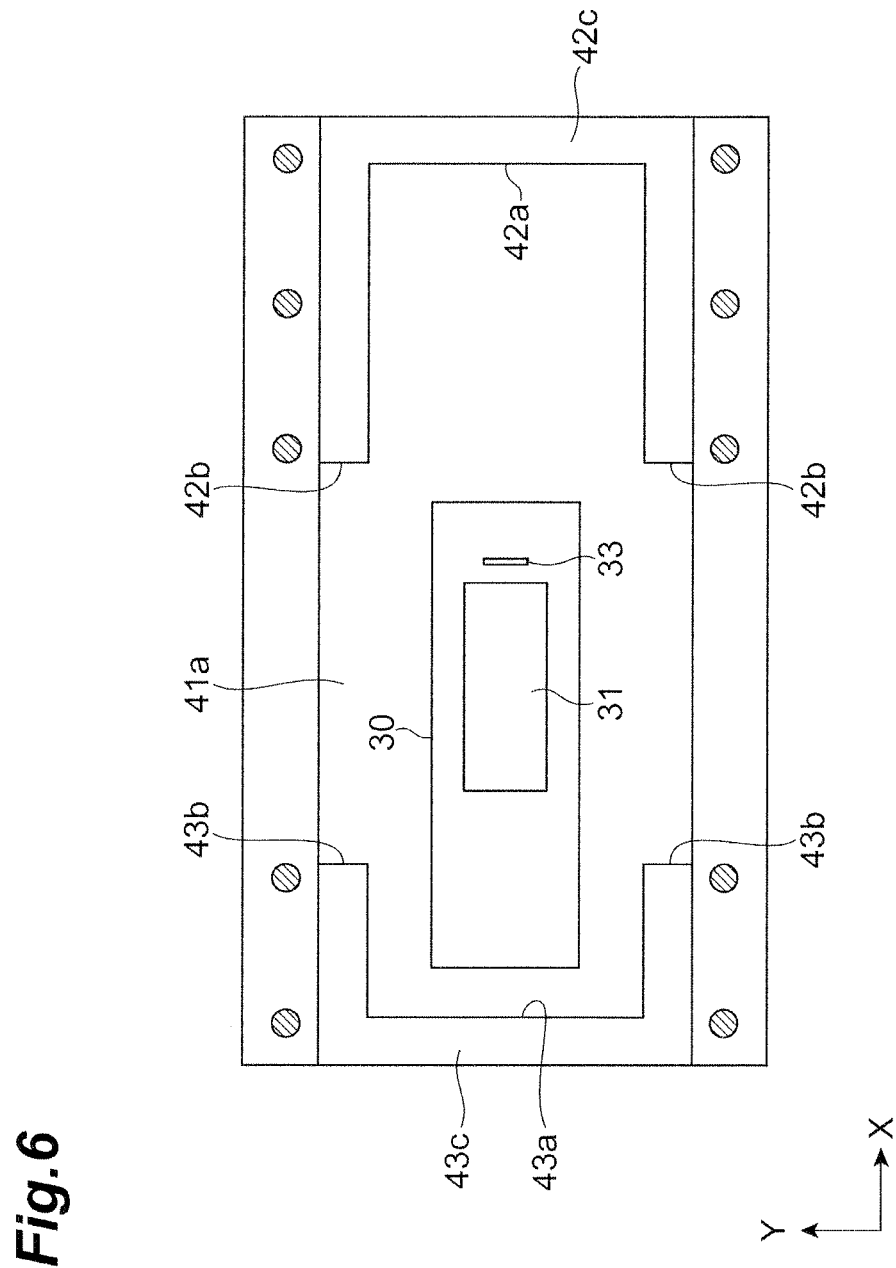
FIG. 6 is a bottom view of a support of a modified example of the spectrometer of FIG. 1.

In addition, as illustrated in FIG. 6, widths of the projections 42b and 43b of the side wall parts 42 and 43 (lengths in the X-axis direction) may be set to be larger than those in a case illustrated in FIG. 1, FIG. 2, and FIG. 4. That is, sizes of the widths of the projections 42b and 43b are not particularly restricted. Further, as illustrated in FIG. 6, the width of the projection 42b of the side wall part 42 may be larger than the width of the projection 43b of the side wall part 43. Furthermore, on the contrary, the width of the projection 43b of the side wall part 43 may be larger than the width of the projection 42b of the side wall part 42. That is, the width of the projection 42b of the side wall part 42 and the width of the projection 43b of the side wall part 43 may be the same or different from each other. In addition, as illustrated in FIG. 6, a width of the side wall part 42 may be the same as a width of the side wall part 43.

Second Embodiment

Figure 7:
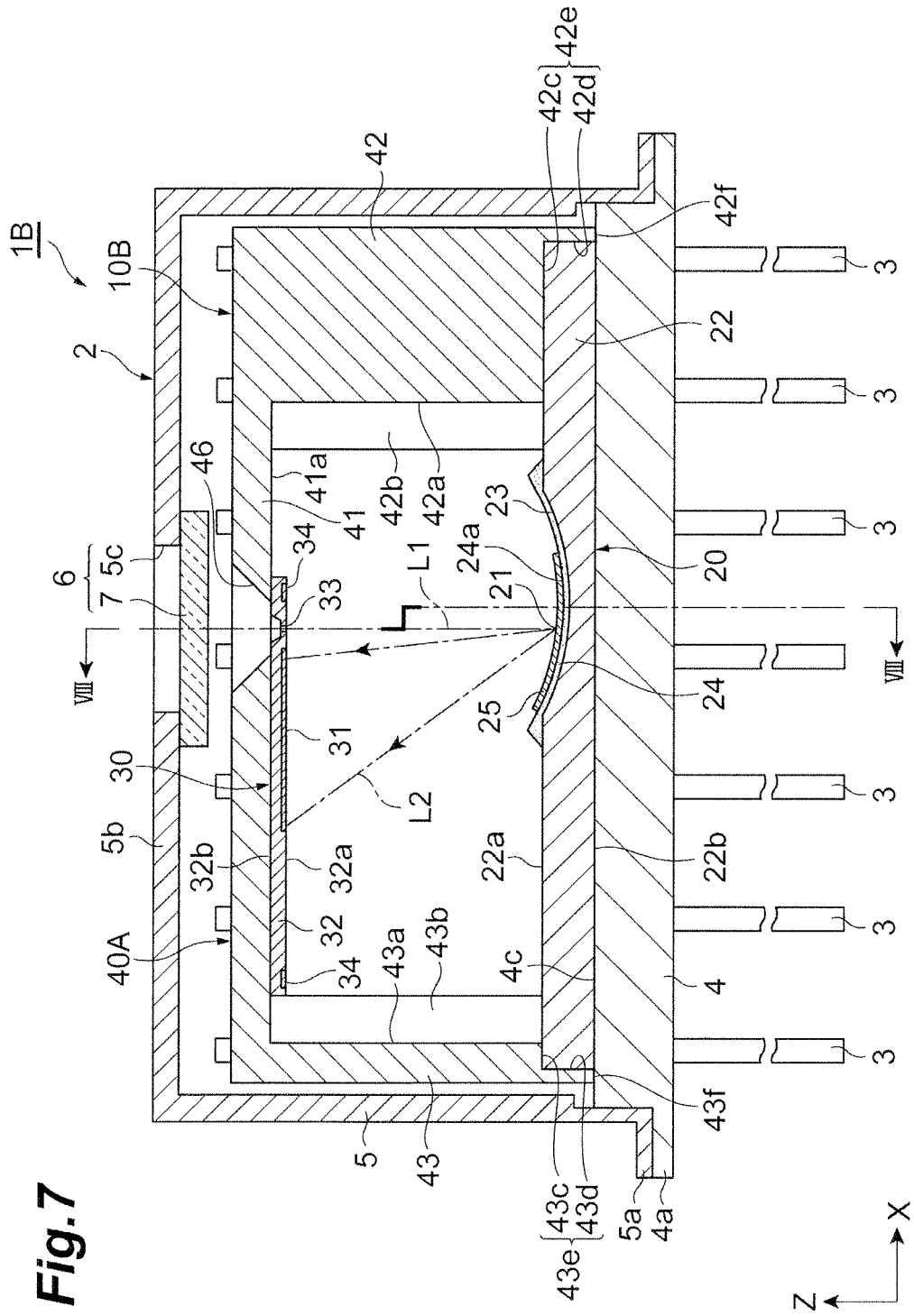
FIG. 7 is a sectional view of a spectrometer in accordance with a second embodiment of the present invention.
Figure 8:
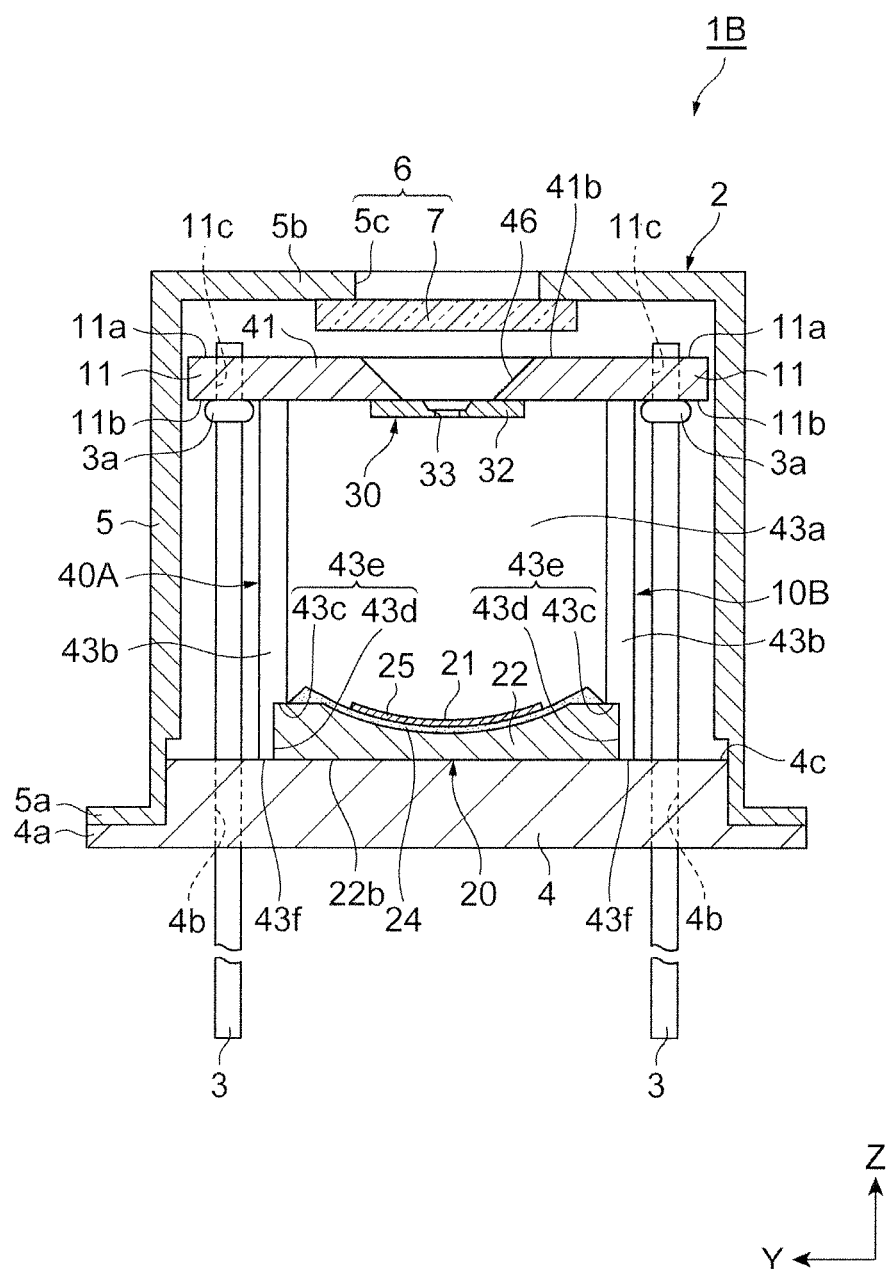
FIG. 8 is a sectional view taken along the line VIII-VIII of FIG. 7 and seen as a side view.
Figure 9:
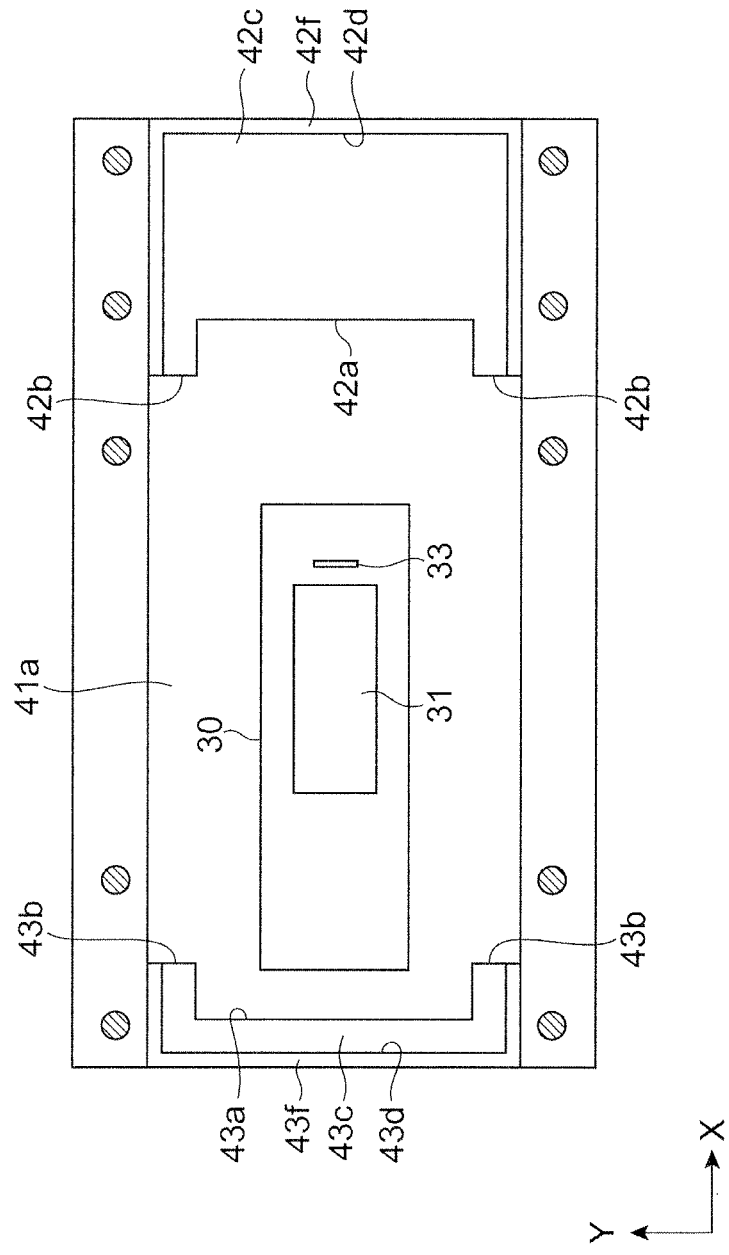
FIG. 9 is a bottom view of a support of the spectrometer of FIG. 7.

As illustrated in FIG. 7, FIG. 8, and FIG. 9, a spectrometer 1B differs from the above-mentioned spectrometer 1A mainly in that a cutout 42e having a bottom face 42c and a side face 42d is formed at an end part of a side wall part 42 on a stem 4 side. A bottom face 42f of the cutout 42e is continuously formed to surround an outside of a contact part of the bottom face 42c of the side wall part 42 and a surface 22a of a substrate 22 (a portion of an outer edge part of the substrate 22). That is, the portion of the outer edge part of the substrate 22 in a dispersive element 20 is fit to the cutout 42e. Similarly, a cutout 43e having a bottom face 43c and a side face 43d is formed at an end part of a side wall part 43 on the stem 4 side. A bottom face 43f of the cutout 43e is continuously formed to surround an outside of a contact part of the bottom face 43c of the side wall part 43 and the surface 22a of the substrate 22 (a portion of the outer edge part of the substrate 22). That is, the portion of the outer edge part of the substrate 22 in the dispersive element 20 is fit to the cutout 43e.

In the spectrometer 1B, similarly to the surface 22b of the substrate 22, the bottom faces 42f and 43f of the cutouts 42e and 43e are not joined to an inner surface 4c of the stem 4 by adhesion, etc. That is, an optical unit 10B is movable with respect to the stem 4 in a contact part of the optical unit 10B and the stem 4 (a portion in which the inner surface 4c of the stem 4 touches the surface 22b of the substrate 22 or the bottom faces 42f and 43f of the cutouts 42e and 43e).

According to the spectrometer 1B configured as described above, effect below is obtained in addition to the effect in common with the above-described spectrometer 1A. That is, in the spectrometer 1B, a dispersive part 21 is easily positioned with respect to a light detection element 30 through a support 40A by fitting the portions of the outer edge part of the substrate 22 to the cutouts 42e and 43e.

Third Embodiment

Figure 10:
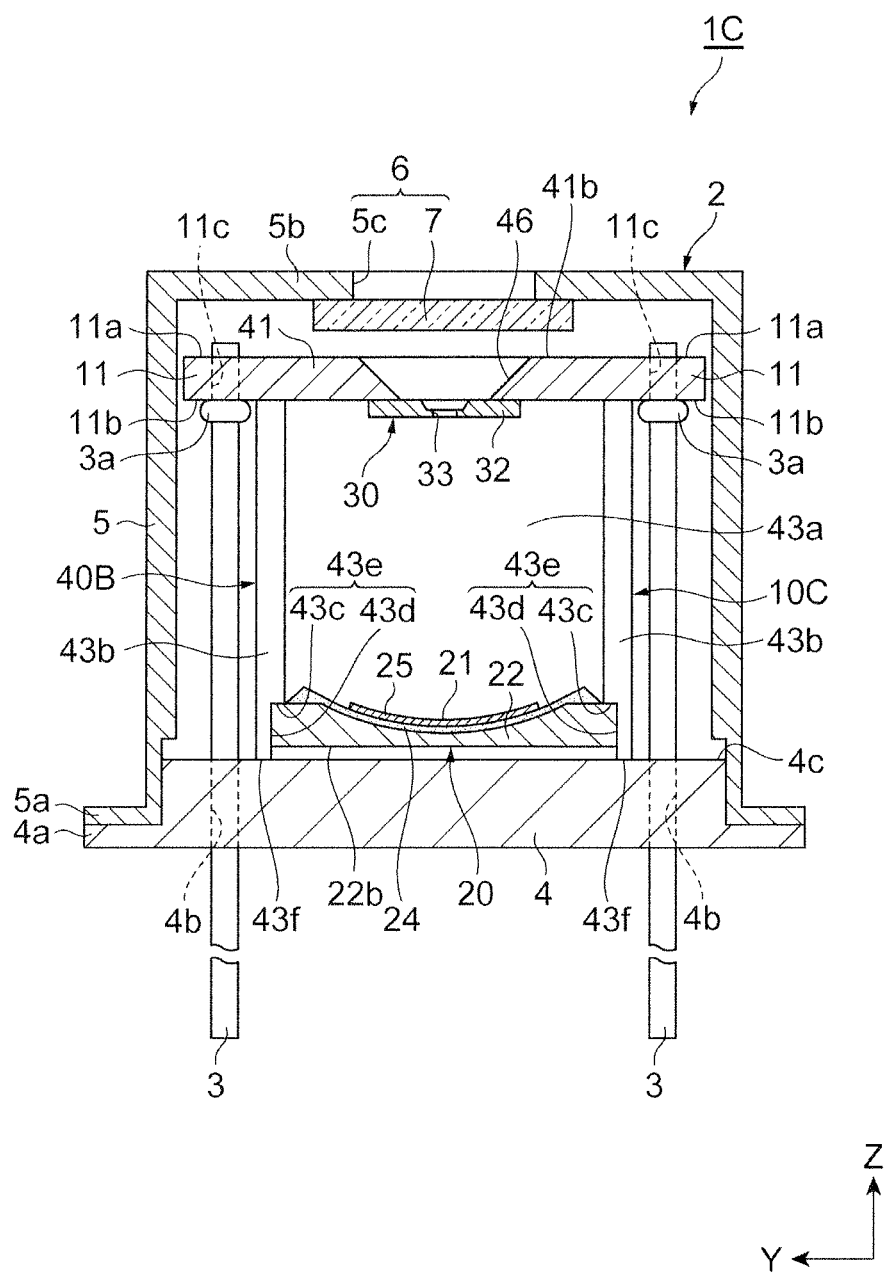
FIG. 10 is a sectional view of a spectrometer in accordance with a third embodiment of the present invention seen as a side view.

As illustrated in FIG. 10, a spectrometer 1C differs from the above-mentioned spectrometer 1B mainly in that a dispersive element 20 is separated from a stem 4. Specifically, in an optical unit 10C of the spectrometer 1C, a surface 22b of a substrate 22 of the dispersive element 20 on the stem 4 side is positioned on the inside of a support 40B having a hollow structure (that is, the opposite side from the stem 4) from a bottom face 42f of a cutout 42e and a bottom face 43f of a cutout 43e substantially flush with each other. In this way, a space is formed between an inner surface 4c of the stem 4 and the surface 22b of the substrate 22 of the dispersive element 20 on the stem 4 side.

According to the spectrometer 1C configured as described above, effect below is obtained in addition to the effect in common with the above-described spectrometer 1A. That is, in the spectrometer 1C, the dispersive element 20 is supported by the support 40B while being separated from the stem 4, and thus it is possible to inhibit heat from affecting a dispersive part 21 from the outside through the stem 4. Therefore, it is possible to suppress deformation of the dispersive part 21 (for example, a change of a grating pitch, etc.) resulting from a temperature change, and to further reduce a wavelength shift, etc.

Fourth Embodiment

Figure 11:
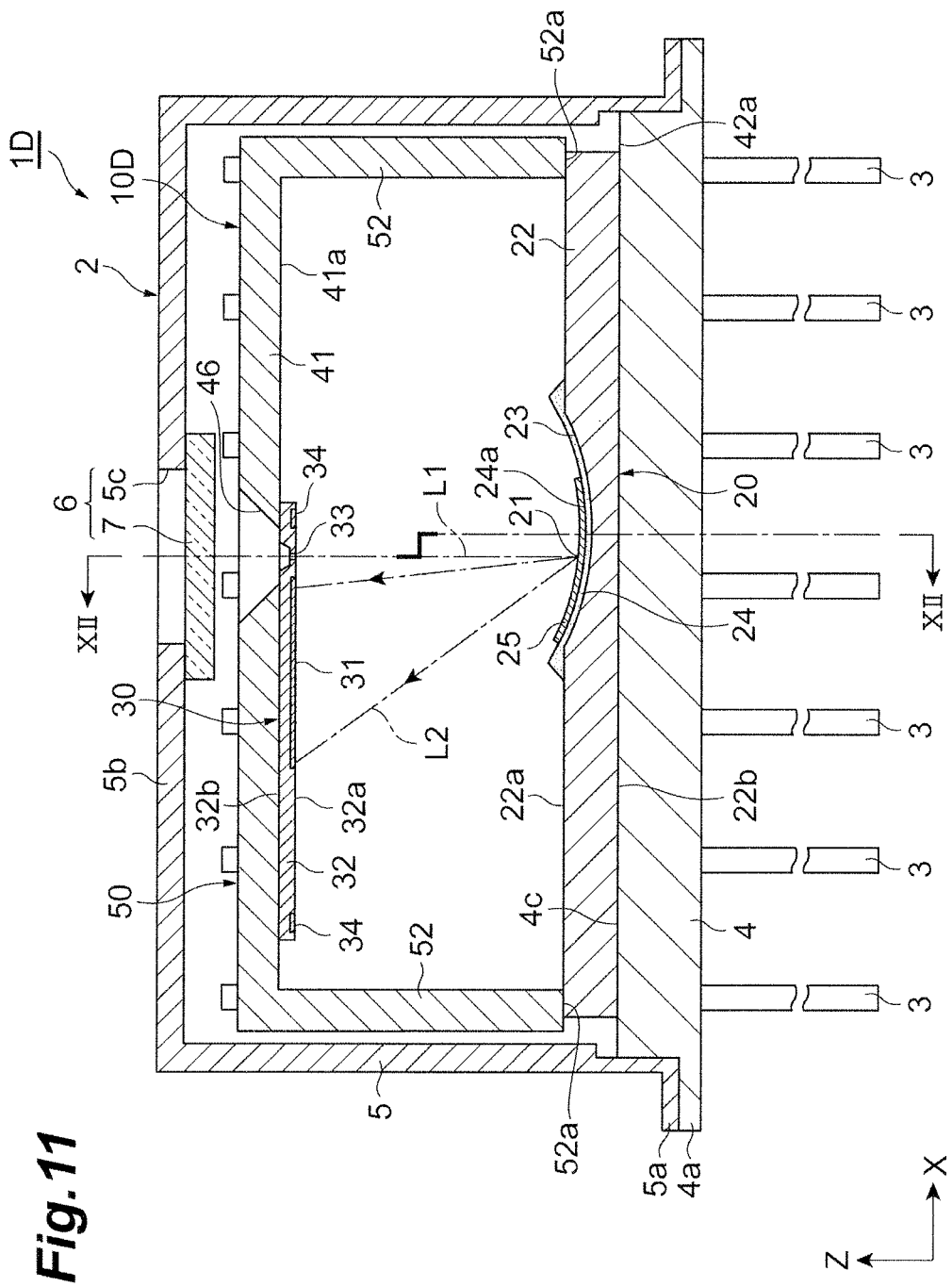
FIG. 11 is a sectional view of a spectrometer in accordance with a fourth embodiment of the present invention.
Figure 12:
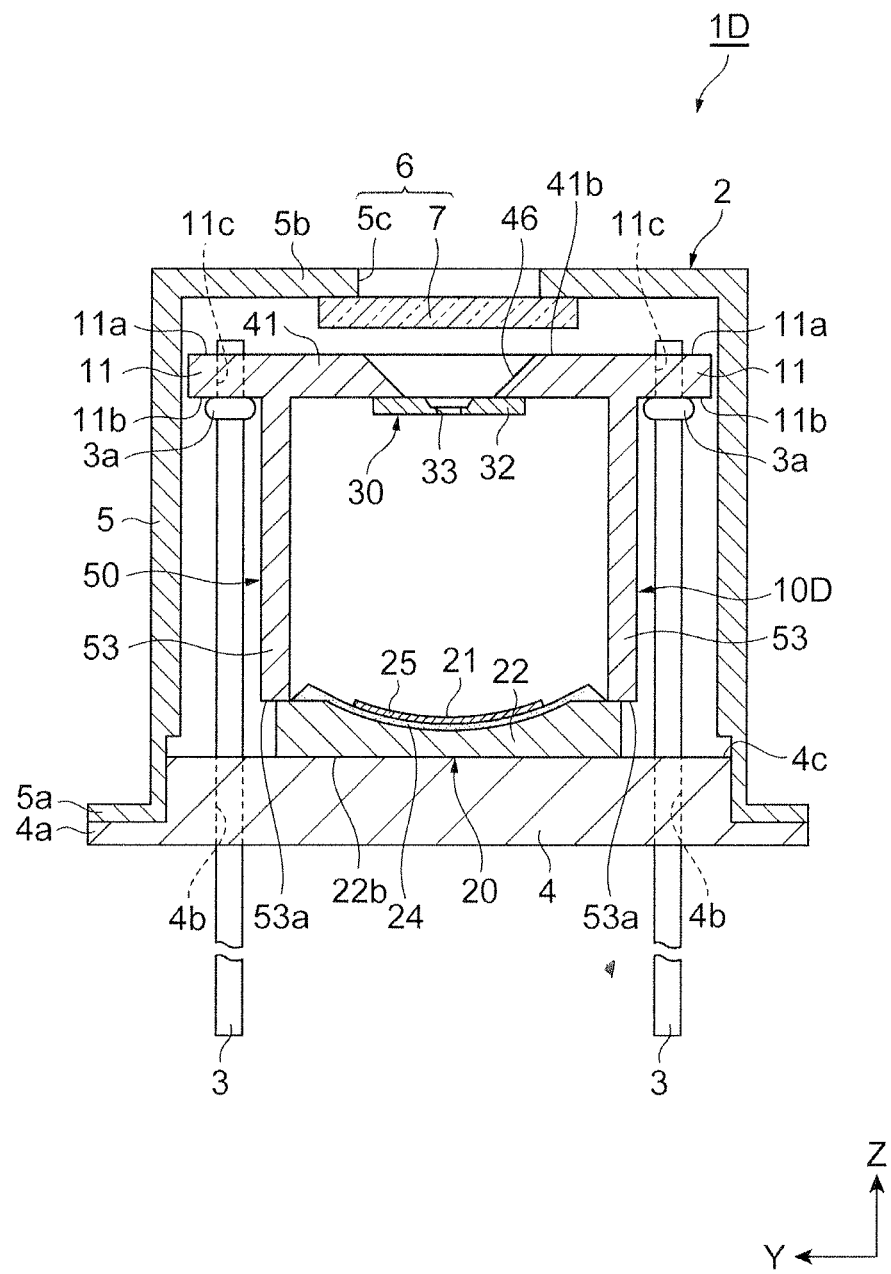
FIG. 12 is a sectional view taken along the line XII-XII of FIG. 11 and seen as a side view.
Figure 13:
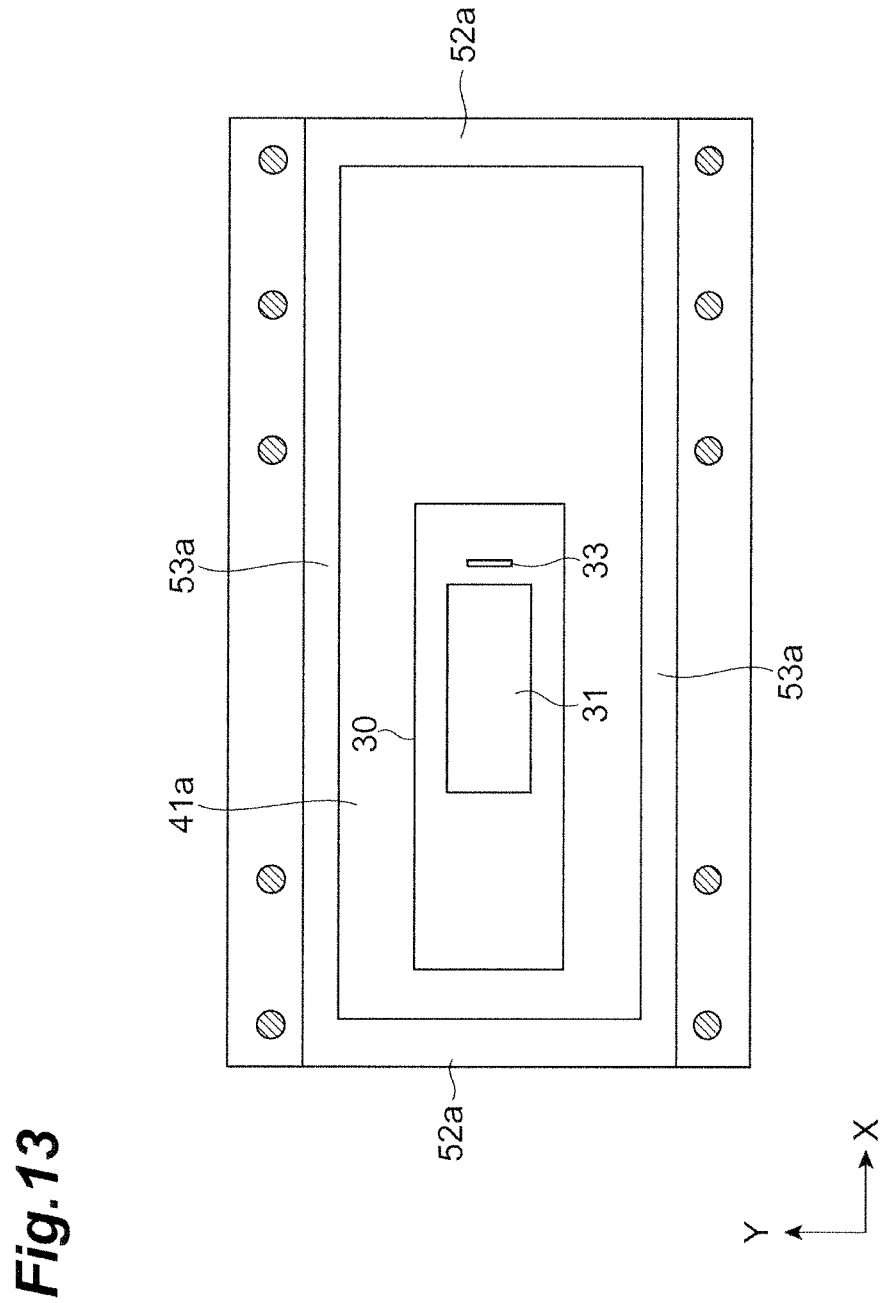
FIG. 13 is a bottom view of a support of the spectrometer of FIG. 11.

As illustrated in FIG. 11, FIG. 12, and FIG. 13, a spectrometer 1D differs from the above-mentioned spectrometer 1A mainly in that a support 50 in an optical unit 10D is a hollow structure including a base wall part 41, a pair of side wall parts 52, and a pair of side wall parts 53. Specifically, the pair of side wall parts 52 is disposed to oppose each other in an X-axis direction, and the pair of side wall parts 53 is disposed to oppose each other in a Y-axis direction. Each of the side wall parts 52 and 53 is disposed to erect from a side of a dispersive part 21 to a stem 4, and supports a base wall part 41 while surrounding the dispersive part 21. That is, a bottom face 52a which is an end part of each side wall part 52 on the stem 4 side and a bottom face 53a which is an end part of each side wall part 53 on the stem 4 side continue while being substantially flush with each other along an outer edge of a substrate 22.

In the spectrometer 1D, the bottom faces 52a and 53a of the respective side wall parts 52 and 53 touch a surface 22a of the substrate 22. The bottom faces 52a and 53a of the respective side wall parts 52 and 53 may be joined to the whole surface 22a of the substrate 22 in order to stabilize positioning of the support 50 with respect to the substrate 22, or partially joined to the substrate 22 in a portion of a contact part of the respective side wall parts 52 and 53 and the substrate 22 (a portion in which the bottom faces 52a and 53a of the respective side wall parts 52 and 53 touch the surface 22a of the substrate 22) in order to mitigate stress or residual stress mutually applied to the support 50 and the substrate 22 due to expansion and contraction.

According to the spectrometer 1D configured as described above, effect below is obtained in addition to the effect in common with the above-described spectrometer 1A. That is, in the spectrometer 1D, positioning of the support 50 with respect to the substrate 22 is stabilized by the pair of side wall parts 52 and the pair of side wall parts 53 which support the base wall part 41 while surrounding the dispersive part 21. Herein, even though a width of the side wall part 52 is the same as a width of the side wall part 53 in the spectrometer 1D, the width of the side wall part 52 may be different from the width of the side wall part 53.

Fifth Embodiment

Figure 14:
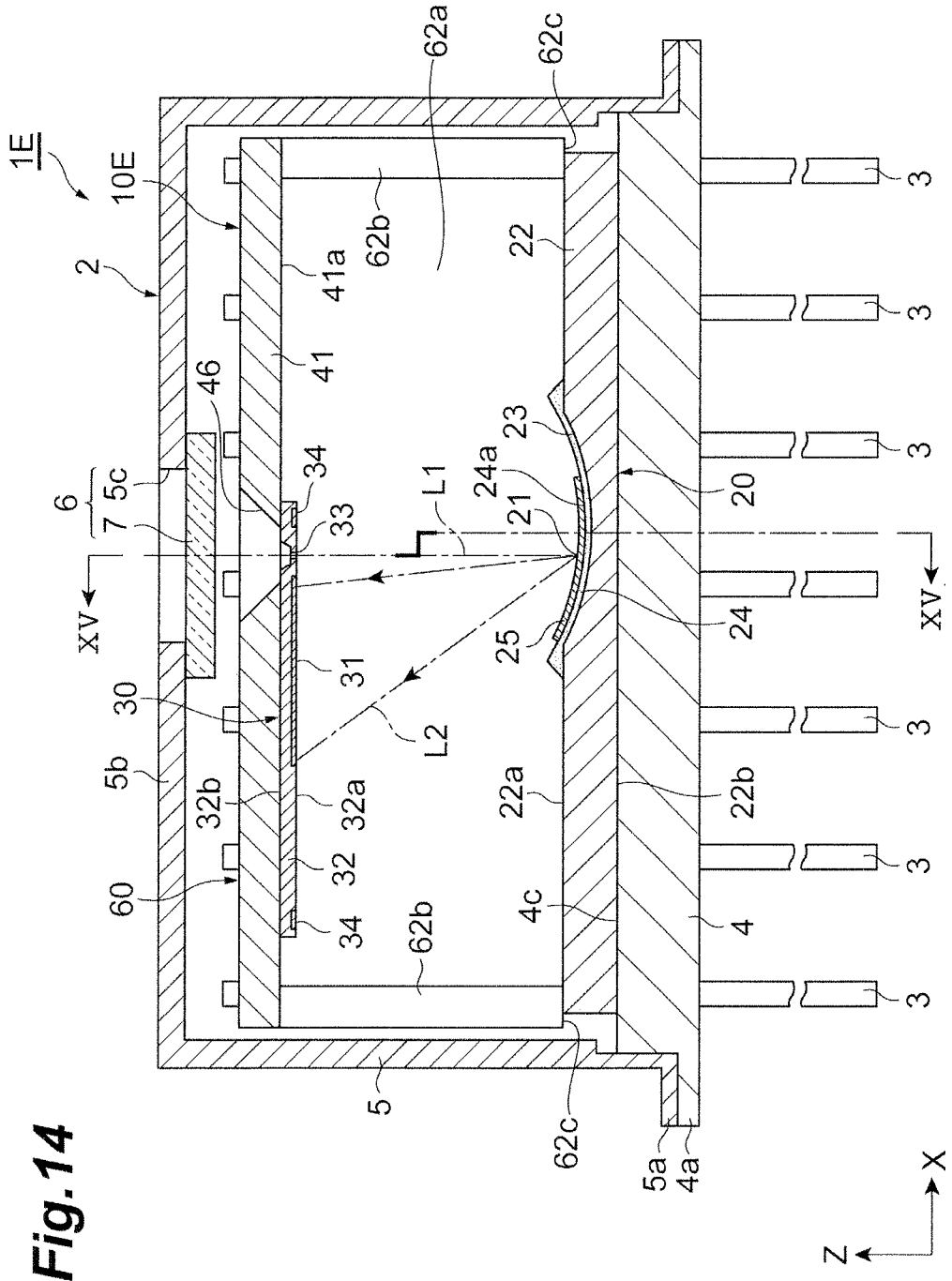
FIG. 14 is a sectional view of a spectrometer in accordance with a fifth embodiment of the present invention.
Figure 15:
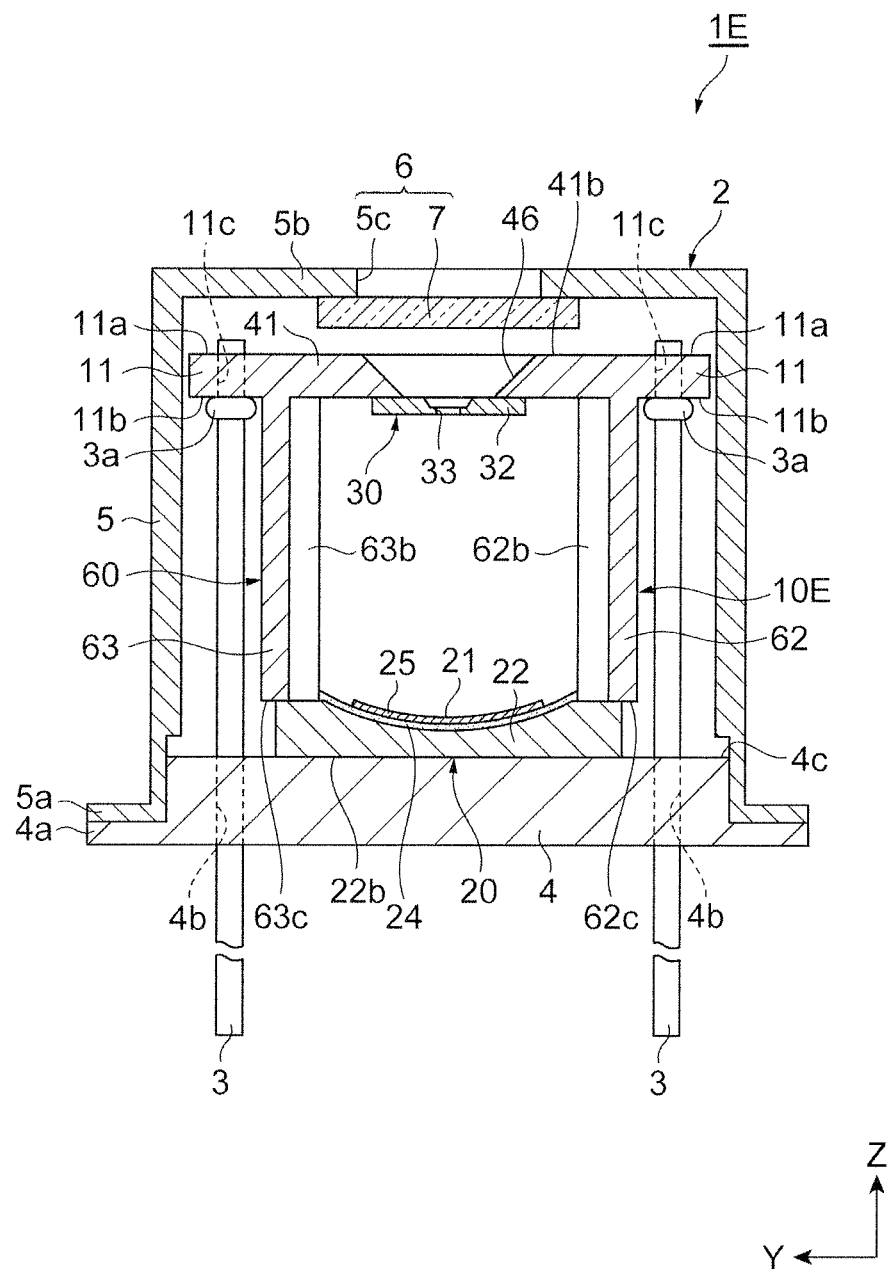
FIG. 15 is a sectional view taken along the line XV-XV of FIG. 14 and seen as a side view.
Figure 16:
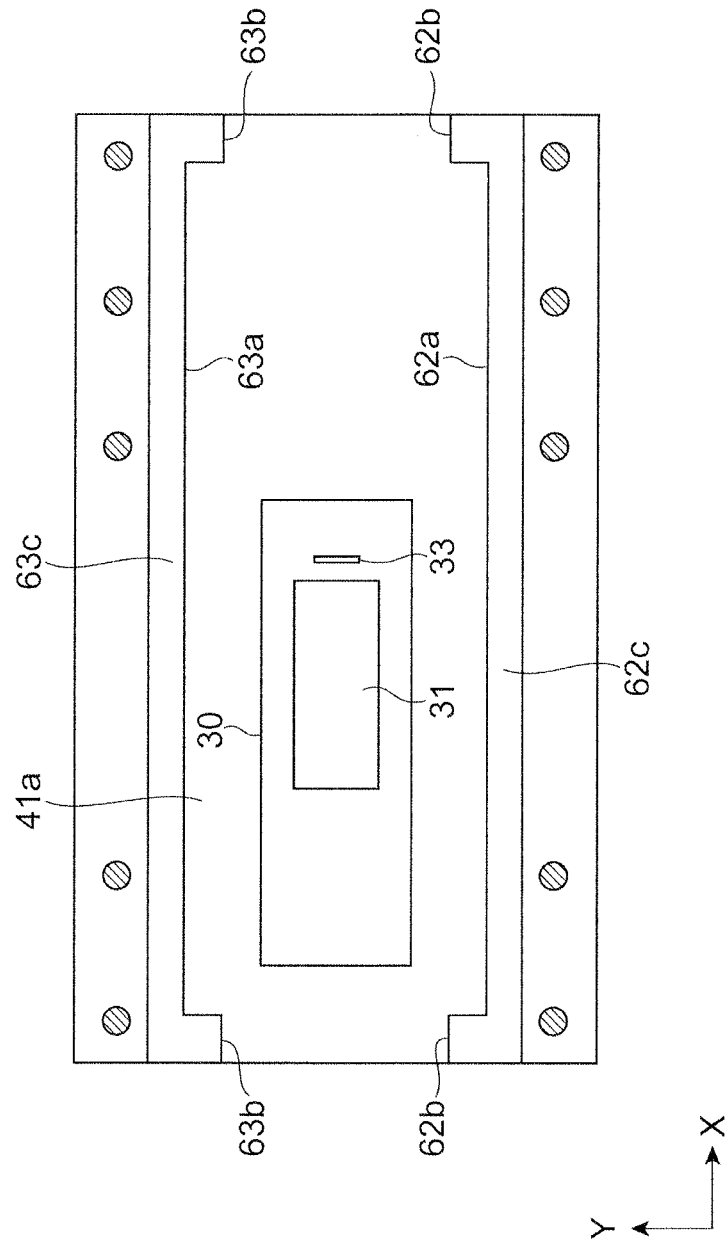
FIG. 16 is a bottom view of a support of the spectrometer of FIG. 14.

As illustrated in FIG. 14, FIG. 15, and FIG. 16, a spectrometer 1E differs from the above-mentioned spectrometer 1A mainly in that a pair of side wall parts 62 and 63 is disposed to oppose each other in a Y-axis direction rather than an X-axis direction in a support 60. The support 60 is a hollow structure including a base wall part 41 disposed to oppose a stem 4 in a Z-axis direction, and a side wall part (first wall part) 62 and a side wall part (second wall part) 63 disposed to oppose each other in the Y-axis direction. The side wall parts 62 and 63 are disposed to erect from a side of a dispersive part 21 to the stem 4, and support the base wall part 41 at both sides interposing the dispersive part 21 therebetween in the Y-axis direction.

At both end sides of a side surface 62a forming an inner end part of the side wall part 62 in the X-axis direction, projections 62b are formed to protrude to a side at which the dispersive part 21 is disposed with respect to the side surface 62a (that is, the inside of the support 60 which is a hollow structure). The projections 62b extend in the Z-axis direction. Similarly, at both end sides of a side surface 63a forming an inner end part of the side wall part 63 in the X-axis direction, projections 63b are formed to protrude to a side at which the dispersive part 21 is disposed with respect to the side surface 63a (that is, the inside of the support 60 which is a hollow structure). The projections 63b extend in the Z-axis direction. When the projections 62b and 63b are formed in the side wall parts 62 and 63, positioning of the support 60 with respect to the substrate 22 is stabilized.

In the spectrometer 1E, bottom faces 62c and 63c of the side wall parts 62 and 63 touch a surface 22a of the substrate 22. The bottom faces 62c and 63c of the side wall parts 62 and 63 may be joined to the whole surface 22a of the substrate 22 in order to stabilize positioning of the support 60 with respect to the substrate 22. Alternatively, the bottom faces 62c and 63c of the side wall parts 62 and 63 may be partially joined to the substrate 22 in a portion of a contact part of the side wall parts 62 and 63 and the substrate 22 (a portion in which the bottom faces 62c and 63c of the side wall parts 62 and 63 touch the surface 22a of the substrate 22) in order to mitigate stress or residual stress mutually applied to the support 60 and the substrate 22 due to expansion and contraction.

According to the spectrometer 1E configured as described above, effect below is obtained in addition to the effect in common with the above-described spectrometer 1A. As described in the foregoing, the X-axis direction is a direction in which the grating grooves of the grating pattern 24a are arranged, and is a direction in which portions for detecting lights having different wavelengths are arranged in the light detection part 31. Therefore, the Y-axis direction perpendicular to the X-axis direction may be a direction in which an influence on a wavelength shift amount is small when a position shift occurs. Herein, in the spectrometer 1E, the side wall part 62 and the side wall part 63 are provided to oppose each other in the Y-axis direction in which an influence on a wavelength shift amount is small when a position shift occurs. In this way, when stress or residual stress mutually applied to the support 60 and the substrate 22 due to expansion and contraction occurs, a position shift of the dispersive part 21 and the light detection part 31 in a light detection element 30 in the X-axis direction may be effectively suppressed. Therefore, a wavelength shift amount may be further reduced.

In addition, as illustrated in FIG. 17, the projections 62b and the projections 63b may not be formed in the side wall part 62 and the side wall part 63. In this case, each of the side wall part 62 and the side wall part 63 has a rectangular shape when viewed in the Z-axis direction. In addition, alternatively, projections may be formed in only one of the side wall part 62 and the side wall part 63.

While the first to fifth embodiments of the present invention are explained in the foregoing, the present invention is not limited to the above-mentioned embodiments. For example, the lead pins 3 are not required to be electrically connected to the second terminal parts 12b of the wiring 12 while being inserted through the projections 11 as in the spectrometers 1A, 1B, 1C, 1D, and 1E. By way of example, a depression may be formed in the projection 11 so as to open to the stem 4 side, and an end part of the lead pin 3 may be placed into this depression. In this case, the second terminal part 12b may be exposed to the inner surface of the depression, and the lead pin 3 and the second terminal part 12b may be electrically connected to each other in the depression. Such a configuration can also securely and easily achieve the electrical connection between the lead pins 3 and the second terminal parts 12b and the positioning of the optical units 10A, 10B, 10C, 10D, and 10E with respect to the package 2.

In addition, the above-described configurations of the spectrometers may be combined with each other within a possible range. For example, in the spectrometers 1A, 1D, and 1E (including various modified examples thereof), it is possible to adopt a configuration in which a cutout is provided in an end part of a side wall part of a support on a stem side as in spectrometer 1B, or to adopt a configuration in which a substrate and a stem are separated from each other as in spectrometer 1C.

The stoppers 3a provided in the lead pins 3 are not limited to those formed like flanges. It is not always necessary for the lead pins 3 to be provided with the stoppers 3a. In addition, a member other than the lead pins 3 (for example, a columnar member) may be used as the fixing member for securing the optical unit to the stem 4. In addition, the support may not have the wiring, and may not be the molded interconnect device (MID). In this case, for example, the lead pins 3 may be directly electrically connected to the terminal 34 of the light detection element 30 using wire bonding.

REFERENCE SIGNS LIST 1A, 1B, 1C, 1D, 1E: spectrometer, 2: package; 3: lead pin (fixing member); 4: stem; 5: cap; 6: light entrance part; 10A, 10B, 10C, 10D, 10E: optical unit; 11: projection; 20: dispersive element: 21: dispersive part; 22: substrate; 30: light detection element; 40, 40A, 40B, 50, 60: support; 41: base wall part; 42, 43, 52, 53, 62, 63: side wall part; 46: light transmission hole (light transmission part); L1, L2: light.

The invention claimed is:
1. A spectrometer comprising:
a package having a stem and a cap provided with a light entrance part; and
an optical unit disposed on the stem inside the package, wherein the optical unit includes
a dispersive element having a dispersive part configured to disperse and reflect light entering the package from the light entrance part,
a light detection element having a light detection part configured to detect the light dispersed and reflected by the dispersive part, and
a support configured to support the light detection element such that a space is formed between the dispersive part and the light detection element, wherein the support includes
a base wall part disposed to oppose the stem, the light detection element being secured to the base wall part, and
a side wall part disposed to erect to the stem, the side wall part supporting the base wall part,
wherein the side wall part includes a first wall part and a second wall part opposing each other, and
a width of the first wall part in a direction in which the first wall part and the second wall part oppose each other is larger than a width of the second wall part in the direction in which the first wall part and the second wall part oppose each other.

2. The spectrometer according to claim 1,
wherein the dispersive element includes a substrate,
the dispersive part is provided on the substrate,
the side wall part is joined to the substrate in a portion of a contact part of the side wall part and the substrate.

3. The spectrometer according to claim 2,
wherein an area of a contact part of the first wall part and the substrate is larger than an area of a contact part of the second wall part and the substrate,
the first wall part is joined to the substrate in at least a portion of the contact part of the first wall part and the substrate, and
the second wall part is movable with respect to the substrate in the contact part of the second wall part and the substrate.

4. The spectrometer according to claim 2,
wherein an area of a contact part of the first wall part and the substrate is larger than an area of a contact part of the second wall part and the substrate,
the first wall part is movable with respect to the substrate in the contact part of the first wall part and the substrate, and
the second wall part is joined to the substrate in at least a portion of the contact part of the second wall part and the substrate.

5. The spectrometer according to claim 1, wherein the first wall part and the second wall part oppose each other in a direction parallel to a direction in which the light detection part is shifted from the dispersive part when viewed in a direction in which the stem and the base wall part oppose each other.

6. The spectrometer according to claim 1,
wherein the dispersive element includes a substrate,
the dispersive part is provided on the substrate,
the first wall part and the second wall part oppose each other in a direction perpendicular to a direction in which the light detection part is shifted from the dispersive part when viewed in a direction in which the stem and the base wall part oppose each other, and
the side wall part is joined to the substrate in at least a portion of a contact part of the side wall part and the substrate.

* * * * *